Patented Oct. 22, 1940

2,218,801

UNITED STATES PATENT OFFICE 2,218,801

LEUCO SULPHURIC ACID ESTERS OF VAT DYESTUFFS OF THE ANTHANTHRONE SERIES

Werner Zerweck and Josef Riedmair, Frankfort-on-the-Main-Fechenheim, Germany, assignors to General Aniline & Film Corporation, New York, N. Y., a corporation of Delaware No Drawing. Application December 7, 1939, Serial No. 307,988. In Germany December 10, 1938

4 Claims. (Cl. 260—359)

Our present invention relates to leuco sulphuric acid esters of vat dyestuffs of the anthanthrone series, more particularly to those of the general formula,

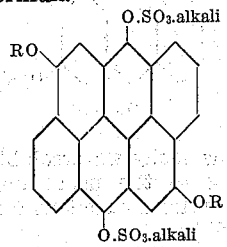

wherein R stands for a member of the group consisting of alkyl radicles and radicles of the benzene series. They are obtained by reducing and esterifying in the presence of tertiary bases with sulphur trioxide or compounds setting free sulphur trioxide the 2.7-dialkoxyanthanthrone as described in U. S. Patents 1,805,912 and 1,805,913, or the corresponding diaryloxyanthanthrones.

The leuco sulphuric ester salts thus obtained are very stable and water soluble. They surpass the dyestuffs themselves as regards tinctorial power and are particularly suitable for cotton printing processes.

In order to further illustrate our invention the following examples are given, the parts being by weight and all temperatures in degrees centigrade.

Example 1

To 200 parts of pyridine, while cooling, slowly 52 parts of chlorsulphonic acid and thereupon a mixture of 20 parts of finely powdered 2,7-dimethoxyanthanthrone and 20 parts of iron powder are added. The mixture is maintained at about 55° for about 5 hours. When no more reddish violet vat dyestuff is present the yellowish reaction pulp is poured into a solution of 70 parts of caustic potash in 2000 parts of water. Then the mixture is heated to about 60° and the iron residue is removed by filtration. From the filtrate by adding potassium chloride the potassium salt of the leuco sulphuric acid ester of the formula

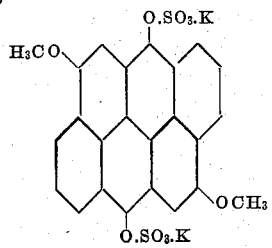

may be isolated and is dried in vacuo. It is a yellow easily water-soluble powder and yields according to the usual methods strong reddish violet prints of excellent fastness on cotton and other fibres.

In contradistinction thereto the dyestuff itself is less suitable for printing cotton, since only feeble and dull shades are obtainable therewith.

When starting for the above described process for instance from 2.7-di-isopropyloxyanthanthrone or 2.7-di-(3'-chlorophenyloxy)-anthanthrone which both are themselves not suitable as vat dyestuffs likewise leuco sulphuric acid esters are obtained yielding on cotton and other fibres strong reddish violet prints of a good fastness, particularly to light. The 2.7-di-(3'-chlorophenyloxy)-anthanthrone not described hitherto in literature may be prepared for instance by converting the 5-chloro-8-nitronaphthalene-1-carboxylic acid by decomposition with 3-chlorophenol into the 5-(3'-chlorophenyloxy) - 8 - nitronaphthalene - 1 - carboxylic acid, reducing to the corresponding amino compound and carrying out the formation of the corresponding dinaphthyl compound and the closure of the anthanthrone ring in the known manner. The leuco sulphuric acid ester corresponds to the formula

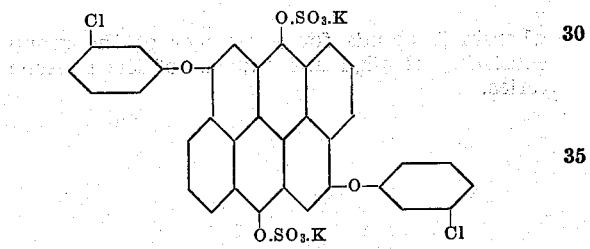

Example 2

To 500 parts of pyridine, while cooling with ice, slowly 100 parts of chlorosulphonic acid are added. Then at about 25° a mixture of 50 parts of 2.7-diethoxyanthanthrone and 50 parts of copper powder is added and the temperature of the reaction mass is increased to about 40°. After stirring for about 5 hours the conversion of the dyestuff into the leuco sulphuric ester has been finished. The yellow reaction mass is then poured on about 5000 parts of water whereby the pyridinium salt of the formed leucosulphuric acid ester separates. It is isolated and by digesting with a mixture of 125 parts of a caustic soda solution of 40° Bé. and about 5000 parts of water at about 60° Bé. it is transformed into the water-soluble sodium salt. The solution is separated from the excess of copper and impurities by filtration in the heat and from the filtrate the sodium salt is separated by adding sodium chloride and then it is isolated. It corresponds to the formula

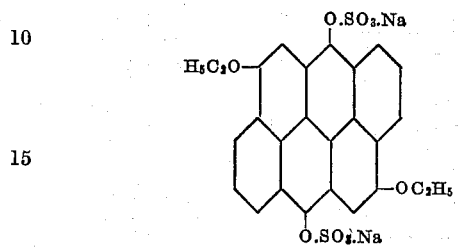

It is when dry a light yellow powder and yields according to the known methods on cotton and other fibres bright purple-red dyeings and prints of good fastness properties. The 2.7-diethoxyanthanthrone itself yields only very feeble and dull dyeings and is unsuitable for the printing process.

When starting likewise from 2.7-dibutyloxyanthanthrone, which is valueless from the tinctorial view, the formed leucosulphuric acid ester yields on cotton valuable purple-red dyeings and prints of a good fastness, particularly to light.

We claim:

1. Leuco sulphuric acid esters of vat dyestuffs of the anthanthrone series of the formula

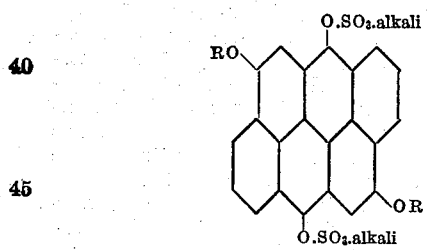

wherein R stands for a member of the group consisting of alkyl and radicles of the benzene series.

2. The vat dyestuff leuco sulphuric acid ester of the formula

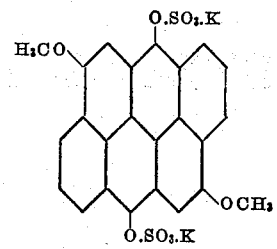

which is a yellow easily watersoluble powder and yields according to the usual methods strong reddish violet prints of excellent fastness on cotton and other fibres.

3. The vat dyestuff leuco sulphuric acid ester of the formula

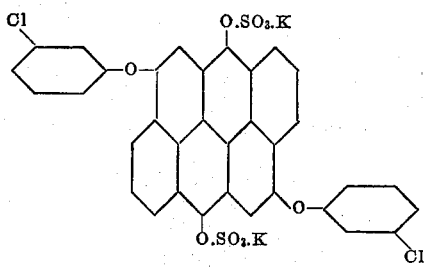

which is a yellow easily watersoluble powder and yields according to the usual methods strong reddish violet prints of excellent fastness on cotton and other fibres.

4. The vat dyestuff leuco sulphuric acid ester of the formula

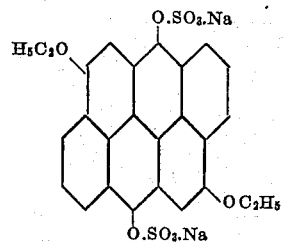

which is a light yellow powder and yields according to the usual methods bright purple-red dyeings and prints of excellent fastness on cotton and other fibres.

WERNER ZERWECK.
JOSEF RIEDMAIR.